United States Patent
Thinnes

(10) Patent No.: US 9,815,394 B2
(45) Date of Patent: Nov. 14, 2017

(54) SEAT HEATER

(75) Inventor: Martin Thinnes, Trierweiler (DE)

(73) Assignee: IEE International Electronics & Engineering S.A., Echternach (LU)

( * ) Notice: Subject to any disclaimer, the term of this patent is extended or adjusted under 35 U.S.C. 154(b) by 1083 days.

(21) Appl. No.: 13/817,867

(22) PCT Filed: Aug. 17, 2011

(86) PCT No.: PCT/EP2011/064140
§ 371 (c)(1),
(2), (4) Date: Feb. 20, 2013

(87) PCT Pub. No.: WO2012/022761
PCT Pub. Date: Feb. 23, 2012

(65) Prior Publication Data
US 2013/0147238 A1    Jun. 13, 2013

(30) Foreign Application Priority Data
Aug. 20, 2010 (LU) .......................... 91722

(51) Int. Cl.
B60R 21/015    (2006.01)
B60N 2/56    (2006.01)
B60N 2/00    (2006.01)

(52) U.S. Cl.
CPC .......... B60N 2/5685 (2013.01); B60N 2/002 (2013.01); B60R 21/0154 (2014.10); B60R 21/01532 (2014.10)

(58) Field of Classification Search
CPC .............. B60N 2/002; B60N 2/5685; B60R 21/01532; B60R 21/0154; H05B 1/0238

(Continued)

(56) References Cited

U.S. PATENT DOCUMENTS 6,079,738 A * 6/2000 Lotito .............. H03K 17/955
280/734
6,161,070 A * 12/2000 Jinno .............. B60R 21/01532
280/735

(Continued)

FOREIGN PATENT DOCUMENTS

WO    2007089654 A2    8/2007

OTHER PUBLICATIONS

International Search Report for corresponding application No. PCT/EP2011/064140 filed on Aug. 17, 2010; dated Sep. 19, 2011.

(Continued)

Primary Examiner — David Angwin
Assistant Examiner — John J Norton
(74) Attorney, Agent, or Firm — Reising Ethington P.C.

(57) ABSTRACT

A seat heater (10) with a heating element (12) connected between a first (14) and a second (16) nodes comprises a third (18) and a fourth (20) node operatively connectable to a first and a second terminal, respectively, of a power supply. A first electric component (22) providing a controllable first conductance is connected between the first and the third nodes. A second electric component (24) providing a controllable second conductance is connected between the second and the fourth nodes. A control network (26) is connected to the electric components to control the respective conductances and has a mode of operation in which it applies an oscillating signal to the heating element by modulating the first and second conductances in such a way that a voltage drop variation between the third and first nodes is opposite to a voltage drop variation between the second and fourth nodes.

15 Claims, 4 Drawing Sheets

(58) Field of Classification Search
USPC .................................................. 340/3.9, 4.34
See application file for complete search history.

(56) References Cited

U.S. PATENT DOCUMENTS

| | | | | |
|---|---|---|---|---|
| 6,392,542 | B1* | 5/2002 | Stanley | B60N 2/002 |
| | | | | 280/735 |
| 6,703,845 | B2 | 3/2004 | Stanley et al. | |
| 9,650,064 | B2* | 5/2017 | Midderhoff | A47C 7/748 |
| 9,656,575 | B2* | 5/2017 | Lamesch | B60N 2/5685 |
| 2001/0045733 | A1* | 11/2001 | Stanley | B60N 2/002 |
| | | | | 280/735 |
| 2003/0151240 | A1* | 8/2003 | Saitou | B60R 21/0154 |
| | | | | 280/735 |
| 2005/0038586 | A1* | 2/2005 | Griffin | B60R 21/01536 |
| | | | | 701/45 |
| 2006/0187038 | A1* | 8/2006 | Shieh | G01B 7/14 |
| | | | | 340/562 |
| 2007/0029768 | A1* | 2/2007 | Clos | B60R 21/01532 |
| | | | | 280/735 |
| 2007/0132559 | A1* | 6/2007 | Schleeh | B60R 21/01532 |
| | | | | 340/425.5 |
| 2007/0208529 | A1* | 9/2007 | Koch | B60N 2/002 |
| | | | | 702/139 |
| 2008/0017625 | A1 | 1/2008 | Ito et al. | |
| 2008/0186034 | A1* | 8/2008 | Scheckenbach | B60R 21/01532 |
| | | | | 324/679 |
| 2008/0259105 | A1* | 10/2008 | Bergstedt | B41J 2/04508 |
| | | | | 347/9 |
| 2009/0295199 | A1* | 12/2009 | Kincaid | A47C 7/748 |
| | | | | 297/180.12 |
| 2011/0115500 | A1* | 5/2011 | Stanley | B60N 2/002 |
| | | | | 324/661 |
| 2011/0121618 | A1* | 5/2011 | Fischer | B60R 21/0154 |
| | | | | 297/180.12 |
| 2011/0148648 | A1* | 6/2011 | Fischer | B60R 21/01532 |
| | | | | 340/686.6 |

OTHER PUBLICATIONS

Written Opinion for corresponding application No. PCT/EP2011/064140 filed on Aug. 17, 2010; dated Sep. 19, 2011.

* cited by examiner

SEAT HEATER

TECHNICAL FIELD

The present invention generally relates to a seat heater, in particular for a vehicle seat, with enhanced functionality.

BACKGROUND OF THE INVENTION

A seat heater comprises a heating element, which is typically a low-resistance conductor (in the form of a wire, cable, conductive trace printed on an insulating substrate, or the like) for being arranged under the seat cover. In operation, a direct current of several amperes is sent through the heating element to generate heat.

Seat heaters may be standard or supplementary equipment on automotive vehicles. A vehicle seat may furthermore be equipped with a capacitive sensor to detect the occupancy state thereof. The detected occupancy state may then be used as an input for various vehicular applications, such as, e.g., a seat belt reminder, occupant classification for low-risk airbag deployment, or the like. The seat heater, in particular the heating element, can affect operation of such seat-based capacitive occupancy sensors when these devices are located in the same area of the seat. A reason for this is that the antenna electrode of the capacitive sensor and the heating element, which appears to be ground to the capacitive sensor, may form a substantially larger capacitance than the capacitance to be measured.

This problem has been addressed e.g. by US 2009/0295199, which discloses a combined seat heater and capacitive sensor. The heating element is coupled both to a heating circuit for being supplied with electrical current for generating heat and to an occupant sensing circuit for sensing the presence of an occupant near the heating element. The arrangement operates by periodically disconnecting the heating circuit from the heating element and connecting the occupant sensing circuit. Because of the sensitivity of the measurements required by the occupant sensing circuit, it is necessary to electrically isolate the heating current source from the heating element to prevent interference with the occupant sensing circuit. Nevertheless, if the heating control circuit has open-switch impedance that combines with and influences the electric field impedance, the accuracy and reliability of occupant detection is reduced. US 2009/0295199 thus proposes an isolation circuit interposed between the heating element and the heating circuit. Specifically, each of the two terminals of the heating element is connected to the heating power supply via two transistors disposed in series. When the arrangement is in capacitive sensing mode, the nodes between each pair of transistors are actively kept at the same potential as the heating element by means of respective voltage followers in order to neutralize any open-switch impedance of the transistors.

The very same idea has already been disclosed in U.S. Pat. No. 6,703,845. As an alternative to transistors, that document also proposed inductors to achieve high impedance at the frequency of the oscillating signal (used for capacitive sensing) between the heating element and the power source of the heating circuit. As in US 2009/0295199, a voltage follower maintains the intermediate nodes substantially at the same potential as the heating element in order to effectively isolate, at the frequency of the oscillating signal, the power supply of the heating circuit from the heating element.

The devices disclosed in U.S. Pat. No. 6,703,845 and US 2009/0295199 have in common that they isolate the heating element from its power supply at least for the frequencies of the capacitive measurement.

BRIEF SUMMARY

The invention provides an alternative solution for applying an oscillating signal to a heating element.

A seat heater, e.g. for a vehicle seat, comprises an electric heating element (e.g. formed of metal wire, conductive fiber, metal foil, metal ribbon, and/or conductive print on an electrically isolating substrate) connected between a first node and a second node to dissipate heat when a heating current is caused to flow across the heating element, between the first and second nodes. The seat heater further comprises a third node operatively connectable to a first terminal of a power supply at a first electric potential and a fourth node operatively connectable to a second terminal of the power supply at a second electric potential. A first (active) electric component is connected between the first node and the third node, and provides there a controllable first conductance (or resistance). A second (active) electric component is connected between the second node and the fourth node and provides there a controllable second conductance (or resistance). A control network is connected to the first and second electric components to control the first and the second conductance, respectively. The control network has a mode of operation in which it applies an oscillating signal to the heating element. To achieve this, the control network is configured to modulate the first conductance and the second conductance in such a way that a variation of a voltage drop between the third and first nodes is opposite to a variation of a voltage drop between the second and fourth nodes. Through the modulation of the first and second conductances, the electric potential of every point between the first and second node is caused to follow the variations of the oscillating signal.

In operation, the first active electric component, the heating element and the second active electric component are connected in series between the positive and the negative terminals of a DC power source, such as, e.g., a battery. On may write:

$$U_{BAT} = U_{T1}(t) + U_{HE}(t) + U_{T2}(t), \qquad (Eqn.\ 1)$$

where $U_{BAT}$ designates the substantially constant voltage provided by the DC power source, $U_{T1}(t)$ the drop voltage across the first active component, $U_{T2}(t)$ the voltage drop across the second active component and $U_{HE}(t)$ the voltage drop across the heating element. $U_{T1}(t)$, $U_{HE}(t)$ and $U_{T2}(t)$ are variable in time t. To apply an oscillating signal s(t) to the heating element, the conductances of the first and second active components may be modulated in such a way that $U_{T1}$ oscillates around a first mean value $U_{T1-0}$ according to $U_{T1}(t) = U_{T1-0} + s(t)$ and that $U_{T2}$ oscillates around a second mean value $U_{T2-0}$ according to $U_{T2}(t) = U_{T2-0} - s(t)$. (Alternatively, one could have $U_{T1}(t) = U_{T1-0} - s(t)$ and to $U_{T2}(t) = U_{T2-0} + s(t)$.) If one substitutes this in Eqn. 1, one find that the voltage drop across the heating element $U_{HE}$ stays substantially constant in this mode of operation.

Those skilled will thus appreciate that the present invention uses active electric components arranged in series with the heating element in the heating circuit to raise or lower the electric potential of the heating element as a whole, in synchronism with the oscillating signal to be applied, by varying the conductance of the active electric components. In contrast, the devices of US 2009/0295199 and U.S. Pat.

No. 6,703,845 use active components in the form of transistors only to electrically isolate the heating element from the heating circuit; any oscillating signal is applied to the heating element via a separate occupant sensing circuit containing a signal generator.

Preferably, the first electric component comprises a first transistor connected between the first node and the third node, the first transistor having a control node, to which the control network is connected to modulate the first conductance. Preferably, the second electric component comprises a second transistor connected between the second node and the fourth node, the second transistor having a control node, to which the control network is connected to modulate the second conductance. The first and/or the second transistor may e.g. be provided as a bipolar junction transistor (BJT), a metal-oxide-semiconductor field-effect transistor (MOSFET) or an insulated gate bipolar transistor (IGBT). Control nodes of transistors are commonly referred to as "base" in the case of bipolar transistors or "gate" in the case of field-effect transistors or IGBTs.

According to a preferred embodiment of the invention, the control network comprises an amplifier wherein the first and second transistors form a push-pull output stage.

According to another preferred embodiment of the invention, the control network comprises a voltage source (e.g. an oscillator, or a signal generator) for generating the oscillating signal, the voltage source being operatively connected to the control node of the first transistor, as well as a current source including the second transistor. Preferably, the current source comprises a reference current source for providing a reference current and a current mirror for drawing across the heating element (via the second transistor) a current corresponding to the reference current.

As will be appreciated, the control network may have a mode of operation in which the oscillating signal is not applied to the heating element and in which the control network controls the first conductance and the second conductance in such a way as to achieve a target temperature. In other words, the active electric components may be used to control the heating function of the heating element. In this mode of operation, the active components may be switched between a (highly) conductive state and an isolating state e.g. to achieve a pulse-width-modulated or a continuous heating current. Alternatively, in this mode of operation, one of the active components is maintained (highly) conductive, while the other active component is used to turn the heating current on or off.

The control network may comprise an input node for receiving a desired oscillating signal to be applied to the heating element. Preferably, the control network comprises a first feedback branch operatively coupled to the first node to bring an oscillating signal on the first node into accordance with the desired oscillating signal and/or a second feedback branch operatively coupled to the second node to bring an oscillating signal on the second node into accordance with the desired oscillating signal.

The oscillating signal is preferably comprised in the frequency band from 50 kHz to 2 MHz, more preferably from 80 kHz to 1.2 MHz.

An aspect of the invention concerns a capacitive occupancy sensing and seat heating device, comprising a seat heater as generally described hereinbefore and a capacitive occupancy sensor. The capacitive occupancy sensor includes an antenna electrode and a capacitive sensing network for applying an oscillating signal to the antenna electrode. The control network of the seat heater and the capacitive sensing network are configured in such a way that the oscillating signal applied to the antenna electrode and the oscillating signal applied to the heating element are of substantially the same amplitude and phase. The heating element may thus be used as a so-called driven shield for the antenna electrode: since the oscillating signals on the antenna electrode and the heating element are of substantially the same amplitude and phase, the electric field between the antenna electrode and the heating element cancels. This substantially eliminates adverse effects of the capacitance between the antenna electrode and the heating element on the capacitive measurement.

Such capacitive occupancy sensing and seat heating device is preferably arranged in a vehicle seat (e.g. of an automotive vehicle) having a seat surface for accommodating an occupant, with the antenna electrode being arranged between the seat surface and the heating element. In this configuration, the heating element when used as a driven shield shields the antenna electrode from the vehicle frame or other conductive parts in the seat.

Yet another aspect of the invention concerns an automotive vehicle comprising at least a first vehicle seat and a second vehicle seat. The first vehicle seat has associated therewith a seat heater as generally described hereinabove, the heating element of which is arranged in the first vehicle seat, and the oscillating signal of which is made indicative of the first vehicle seat. Also the second vehicle seat has associated therewith a seat heater as generally described hereinabove, the heating element of which is arranged in the second vehicle seat, and the oscillating signal of which is indicative of the second vehicle seat. The oscillating signals applied to the heating elements in the first and the second seat are thus distinct from one another. This may e.g. be achieved by using oscillating signals with different frequencies, or modulated oscillating signals carrying unequivocal seat identification codes. The vehicle further comprises an appliance (e.g. a radio, a car navigation system, an HVAC, an infotainment system, or the like) including an appliance control device (such as, for instance, a button, a knob, a touch screen, a joystick, a slider, a control panel, etc.) arranged in the vehicle compartment at a location where an occupant of the seat can interact with it. The vehicle includes an antenna electrode arranged with (e.g. in, on or adjacent to) the appliance control device and a sensing network. The sensing network is connected to the antenna electrode and configured for detecting an electric signal (current or voltage) induced in the antenna electrode in response to an electric field caused by the oscillating signal in the heating element of the first or the second vehicle seat. Those skilled will appreciate that the electric signal induced in the antenna electrode indicates whether an occupant of the first or the second vehicle seat has a part of their body proximate to the appliance control device. The appliance is configured to adapt its behaviour depending on whether an occupant of the first or the second vehicle seat has a part of their body proximate to the appliance control device.

As will be appreciated, a system as described in the previous paragraph enhances the operability of appliances in a car compartment. The electric signal induced in the antenna electrode is used by the sensing network to determine which of the occupants is attempting to interact with the appliance control device. Depending on who is attempting to interact with the control device, its functionality may be adjusted to the detected occupant. If the received signal is that of the driver seat, for instance, minimum distraction functionality may be enabled; on the other hand, if the received signal is that of the seat of the front passenger, expanded capability, communication and customization control functions may be enabled. The appliance may also be configured to refuse access to certain functions if is detected that the front passenger is manipulating the control device.

It is worthwhile noting that the sensing network may be separate from the seat heater. Accordingly, the present system can be implemented easily during assembly of the vehicle.

BRIEF DESCRIPTION OF THE DRAWINGS

Preferred variants of the invention will now be described, by way of example, with reference to the accompanying drawings in which.

Throughout the drawings, same or functionally similar elements are identified with the same reference numbers.

DETAILED DESCRIPTION

Figure 1:
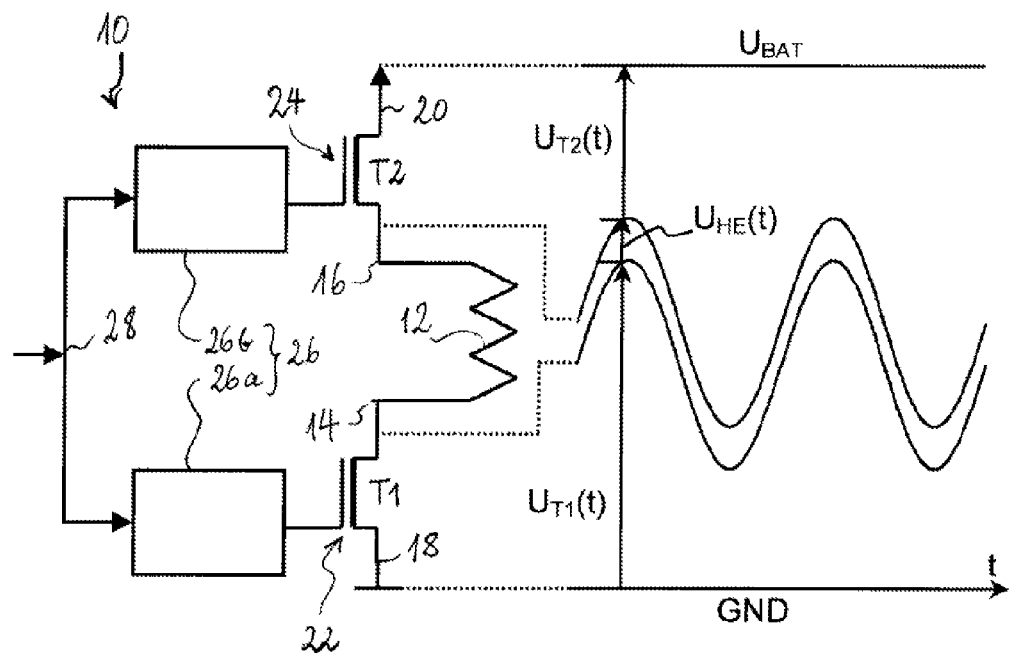
FIG. 1 is a schematic layout of a seat heater according to the invention with an illustration of its principle of operation.
Figure 2:
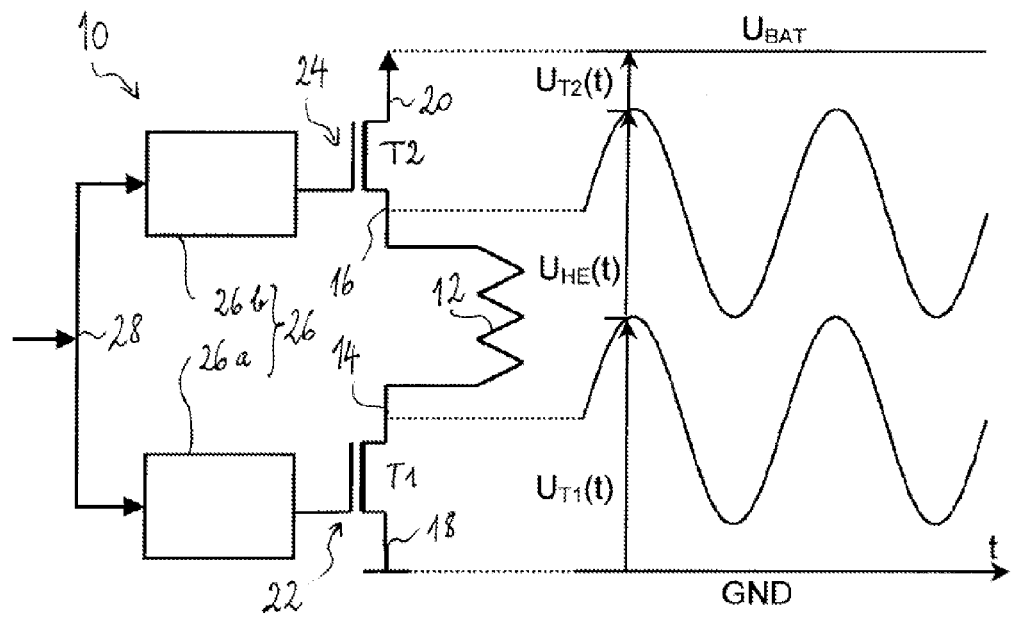
FIG. 2 is corresponds to FIG. 1, wherein a higher voltage drop across the seat heater is maintained during operation.

FIGS. 1 and 2 illustrate the functioning of a seat heater 10 according to the invention. The seat heater 10 comprises a comprises an electric heating element 12 (e.g. formed of metal wire, conductive fiber, metal foil, metal ribbon, and/or conductive print on an electrically isolating substrate) having a resistance typically comprised in the range from 1 to 10Ω between the first node 14 and the second node 16. When electric current flows across the heating element 12, electric energy is converted into heat through the process of Joule heating. The heating element 12 is integrated in a heating circuit to provide the electric current needed for the heating. The heating element is operatively connected at third node 18 to the ground terminal of a DC power supply (e.g. a battery, not shown) via a first active electric component 22, implemented here as first transistor T1. At the fourth node 20, the heating element 12 is operatively connected to the positive terminal of the power supply via a second active electric component 24, implemented here as second transistor T2. The electric potential of the positive terminal is designated by $U_{BAT}$. The conductance of the first transistor between nodes 14 and 18, as well as the conductance of the second transistor between nodes 16 and 20 is controlled by subunits 26a and 26b, respectively, of a control network 26.

When heating of the seat (not shown in FIGS. 1 and 2) is required, the control network 26 operates the heating element in heating mode. In this mode of operation, the first and second transistors T1, T2 are used as switches. To allow heating, both switches are closed. To stop or interrupt heating, at least one of the switches is opened, thus preventing DC current to flow across the heating element 12. To regulate the heating temperature, the heating current may be pulse-width-modulated, which is, per se, a well-known technique. The control network 26 is preferably connected to a temperature sensor (not shown) to control the heating temperature.

The control network 26 may also operate in another mode, in which it applies an oscillating signal to the heating element 12. The signal s(t) to be applied to the heating element 12 is input on input node 28. The control network 26 modulates the conductance of the transistors T1 and T2 in such a way that variations of the voltage drop between nodes 14 and 18 are opposite (i.e. of same amplitude but of opposite sign) to the variations of the voltage drop between the nodes 20 and 16. $U_{BAT}$, the substantially constant voltage provided by the DC power source, $U_{T1}(t)$, the voltage drop across the transistor T1, $U_{T2}(t)$, the voltage drop across the second transistor T2, and $U_{HE}(t)$, the voltage drop across the heating element 12, are linked by Eqn. 1:

$$U_{BAT}=U_{T1}(t)+U_{HE}(t)+U_{T2}(t).$$

The control network modulates the conductances across the transistors T1 and T2 in such a way that $U_{T1}$ oscillates around a first mean value $U_{T1-0}$ according to $U_{T1}(t)=U_{T1-0}+s(t)$ and that $U_{T2}$ oscillates around a second mean value $U_{T2-0}$ according to $U_{T2}(t)=U_{T2-0}-s(t)$. (Alternatively, one could have $U_{T1}(t)=U_{T1-0}-s(t)$ and to $U_{T2}(t)=U_{T2-0}+s(t)$.) The conductances of the transistors are in fact modulated in such a way that the electric potentials of the first node 14 and the second node 16 are drawn up and down in phase with each other and in accordance with the signal s(t). FIGS. 1 and 2 show the voltage drops $U_{T1}(t)$, $U_{HE}(t)$ and $U_{T2}(t)$ as 100%-stacked-area charts.

Those skilled will appreciate that one may alternately set the resistance of the first and the second transistor T1, T2 to a high value compared to the resistance of the heating element 12. In this case, only a very low heating current may develop across the series network of the transistor T1, the heating element 12 and the transistor T2. Furthermore, there is only a small potential difference between the first node 14 and the second node 16. This is the situation illustrated in FIG. 1.

FIG. 2 illustrates that it is possible to maintain a significant, substantially constant, voltage drop across the heating element 12 while the oscillating signal is applied. In this case, the effective resistances of the transistors T1 and T2 are of the same order of magnitude as the resistance of the heating element 12. Accordingly, a significant heating current may flow in the heating circuit. This corresponds to a mode of mixed operation (heating function and signal emission).

It is expected that, in practice it will be technically easier to operate the transistors T1 and T2 as in FIG. 1 rather than as in FIG. 2. Keeping direct current at a low level (as in FIG. 1) has the additional advantage that one may achieve a higher modulation amplitude (up to $U_{BAT}/2$).

Figure 3:
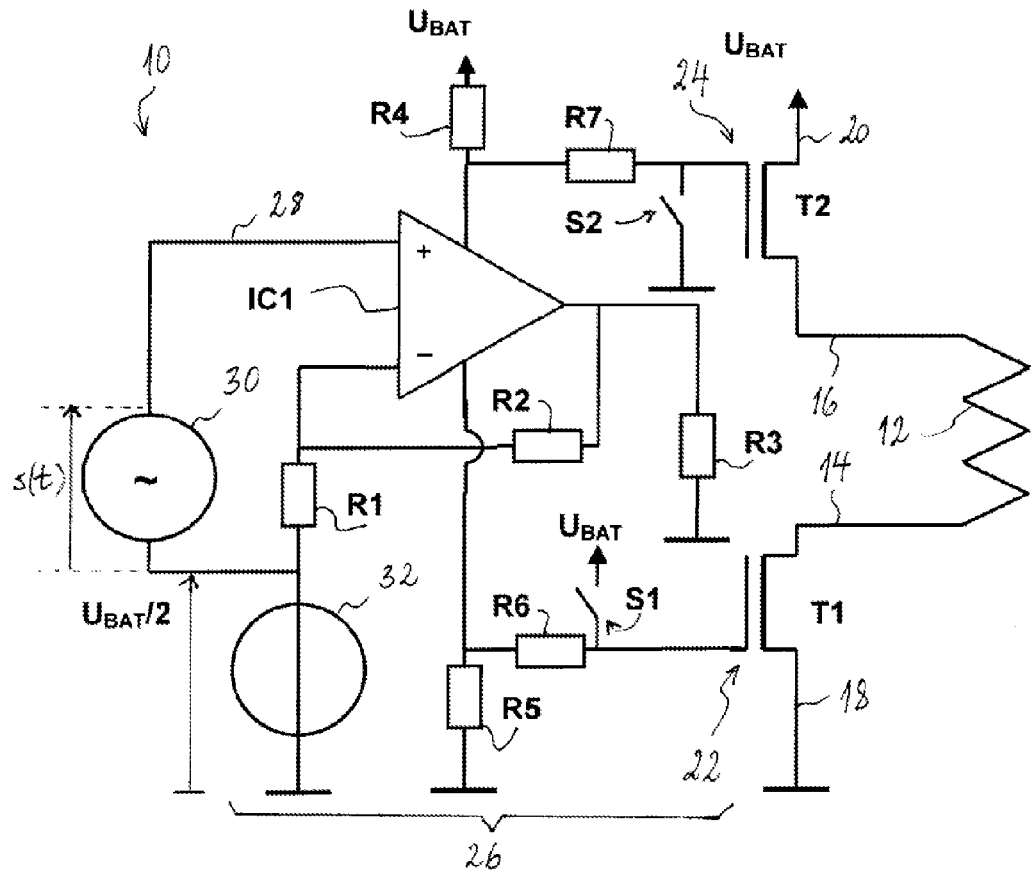
FIG. 3 is a schematic layout of a seat heater according to the invention using a push-pull amplifier stage.

FIG. 3 illustrates a possible embodiment of the seat heater 10 generally depicted in FIG. 1. Transistors T1 and T2 are here implemented as an n-MOSFET and a p-MOSFET, respectively, which form a push-pull amplifier stage of the control network 26. If switch S1 is closed, transistor T1 is conducting. If switch S2 is closed, T2 is conducting. By closing both S1 and S2, a DC current will flow across the seat heater (heating mode).

When both S1 and S2 are open, the control network 26 acts as an amplifier for the signal s(t) provided by the oscillator 30 on input node 28. The two transistors T1 and T2 are connected to the operational amplifier IC1 is such a way that they are amplify the output current of the operational amplifier IC1. The operational amplifier IC1 is connected in the non-inverting configuration. The operation point of the amplifier IC1 is set to half the battery potential ($U_{BAT}/2$) by voltage source 32. The voltage on input node 28 corresponds to the sum of the oscillating voltage s(t) and $U_{BAT}/2$. The oscillating signal s(t) appears on the output node of the push-pull amplifier output stage, i.e. between T1 and T2, which is occupied by the heating element 12. The transistors T1 and T2 are alternately high-ohmic. This results in a low voltage drop across the heating element 12 ($U_{HE}(t)$ 0). The voltage on the heating element (with respect to ground) thus amounts to $U_{BAT}/2+s(t)$.

Figure 4:
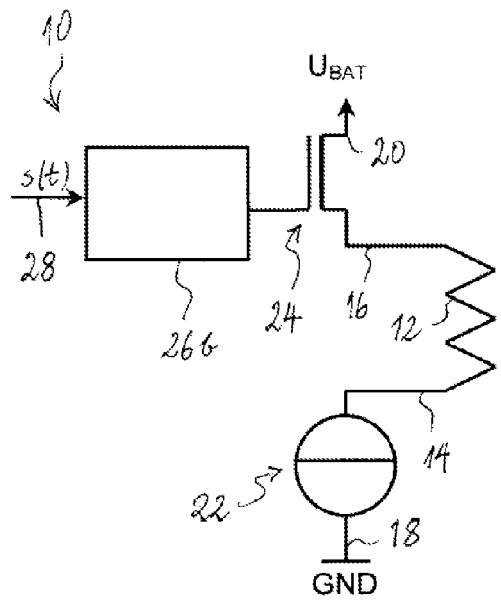
FIG. 4 is a schematic layout of a seat heater according to the invention wherein one of the active electric components is provided as a current source.

FIG. 4 illustrates a variant of the seat heater 10 generally depicted in FIG. 1. The first active electric component is in this case a current source. When the oscillating signal s(t) is applied to the gate of transistor T1, the current source acts in such a way as to maintain the current between nodes 14 and 18 (and thus the current $I_0$ across the series network of the transistor T1, the heating element 12 and the current source) substantially constant. Using $U_{HE}(t)=R_{HE} \cdot I_0$, where $R_{HE}$ represents the resistance of the heating element, in eqn. 1, one finds that any variation $dU_{T2}(t)$ of the voltage drop $U_{T2}(t)$ across the transistor T2 results in a corresponding opposite variation $dU_{T1}(t)$ of the voltage drop $U_{T1}(t)$ across the current source: $dU_{T1}(t)=-dU_{T2}(t)$.

Figure 5:
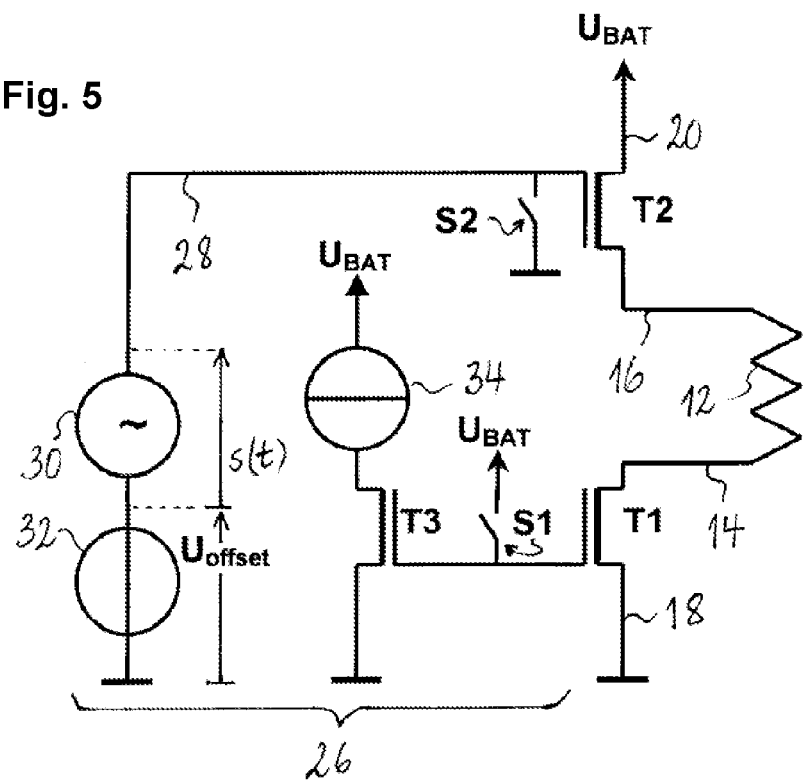
FIG. 5 is a more detailed schematic layout of a possible embodiment of the seat heater of FIG. 4.

FIG. 5 illustrates a preferred embodiment of the seat heat of FIG. 4. Transistors T1 and T2 are implemented here as an n-MOSFET and a p-MOSFET, respectively. T3 is an n-MOSFET. If switch S1 is closed, transistor T1 is conducting. If switch S2 is closed, T2 is conducting. By closing both S1 and S2, a DC current will be allowed to flow across the seat heater (heating mode).

Transistor T1 is part of a current source implemented as a current mirror. Reference current source provides a constant reference current across transistor T3. the gates of T1 and T3 are connected, so that T1 mirrors the reference current, when switch S1 is open. With S2 open, the voltage on input node 28 corresponds to the sum of the oscillating voltage s(t) provided by the oscillator 30 and an offset voltage $U_{offset}$ provided by voltage source 32.

Figure 6:
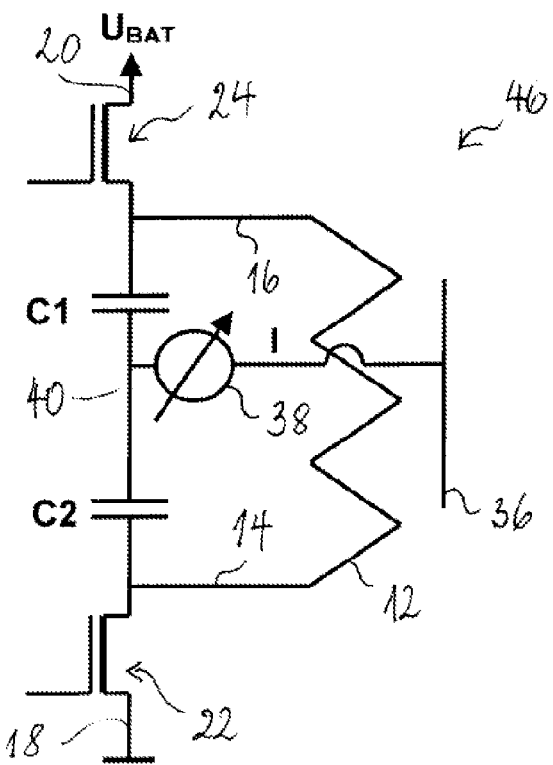
FIG. 6 is a schematic layout of a combined capacitive sensing and seat heater system.

FIG. 6 shows a combined capacitive sensing and seat heater system 46. The system 46 comprises a seat heater as described hereinabove. A capacitive sensing network is operatively coupled to the seat heater. The capacitive sensing network comprises an antenna electrode 36 and a current meter 38 configured and arranged for measuring a current I flowing into the antenna electrode 36 in response to an alternating voltage being applied to it. The current meter 38 and the antenna electrode 36 are AC-coupled at node 40 to the first and second nodes 14 and 16 via capacitors C2 and C1, respectively.

When an oscillating voltage signal is applied to the heating element 12 by modulation of the conductances of the active electric components (e.g. transistors, as shown in FIG. 6) 22 and 24, the same signal is coupled into node 40 via coupling capacitors C1 and C2. This will cause an alternative current I into the antenna electrode. Amplitude and phase (or the real and the imaginary components) of current I with respect to the alternating voltage on node 40 depend on (and are thus indicative of) the capacitance between the antenna electrode 36 and ground. Thanks to the coupling capacitors C1 and C2, the heating element 12 and the antenna electrode 36 are maintained at substantially the same potential while an oscillating signal is applied to them. Accordingly, the heating element 12 serves as a driven shield for the antenna electrode 36.

The combined capacitive sensing and seat heater system 46 is preferably arranged in a vehicle seat in such a way that the antenna electrode 36 is closer to the seat cover than the heating element 12. The latter is preferably arranged in a layer substantially parallel to the antenna electrode, in such a way that the antenna electrode lies between the heating element and the seat cover. Those skilled will appreciate that the heating element in this case serves to shield the antenna electrode from adverse influences from the seat frame and/or conductive components buried in the seat foam.

Figure 7:
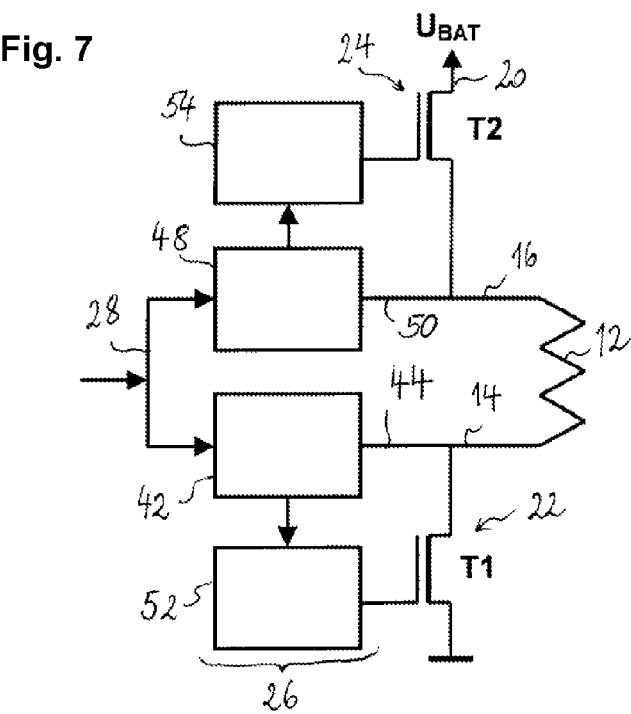
FIG. 7 is a schematic layout of a seat heater according to the invention with feedback control of the electric potentials at the first and second node.

FIG. 7 shows a variant of the seat heater of FIG. 1 with feedback control of the electric potentials at the first and second nodes. The control network 26 in this variant of the invention comprises a first regulating element 42 with a first feedback branch 44 coupled to the first node 14 to bring the oscillating signal on that node into accordance with the desired oscillating signal on input node 28. A second regulating element 48 with a second feedback branch 50 is coupled to the second node to bring the oscillating signal on the second node 16 into accordance with the input oscillating signal. The regulating elements 42 and 48 compare the oscillating signal on input node 28 with the oscillating signals actually generated in the first and second node, respectively, and control the driving networks 52, 54 of the transistors T1 and T2.

Figure 8:
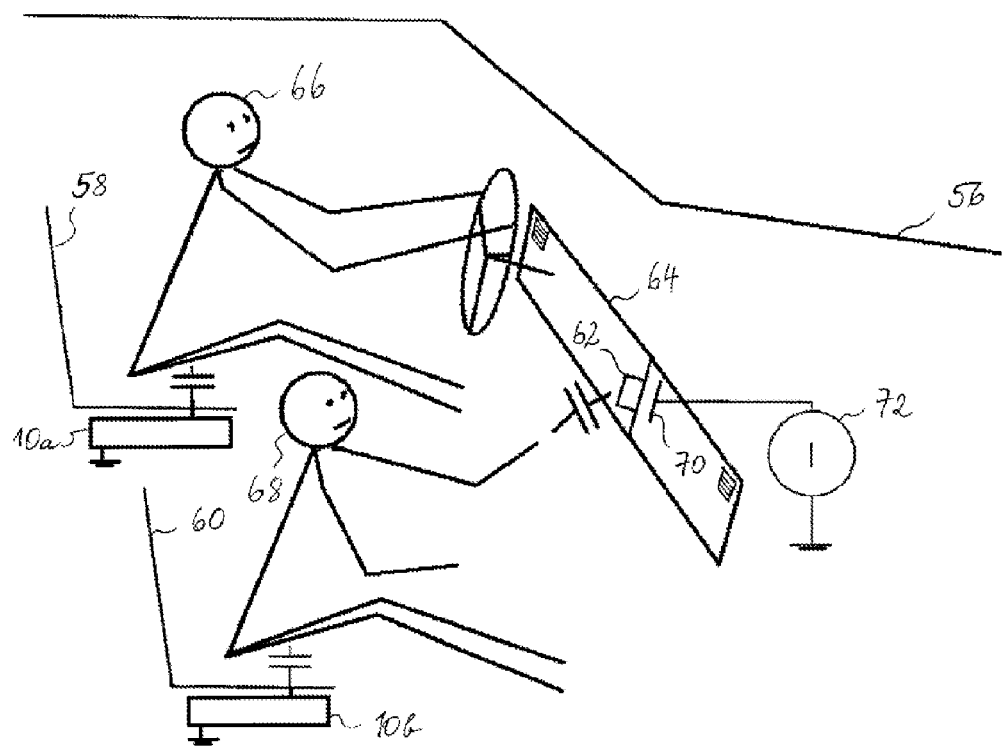
FIG. 8 is a schematic illustration of a vehicle having its front seats equipped with a seat heater according to the invention.

FIG. 8 is an illustration of a possible application of seat heaters according to the invention. It shows an automotive vehicle 56 comprising a driver seat 58 and a front passenger seat 60. Each of the seats 58 and 60 has associated therewith a seat heater 10a or 10b, respectively. The heating elements of the seat heaters 10a and 10b are arranged in the seating portions of the seats 58 and 60, respectively. The vehicle 56 further comprises an appliance (e.g. a radio, a car navigation system, an HVAC, an infotainment system, or the like) including a control device 62 arranged on the dashboard 64 in a central location where both the driver 66 and the front passenger 68 can interact with it. The vehicle 56 includes an antenna electrode 70 arranged adjacent to the appliance control device 62 and a sensing network 72 operatively connected with the antenna electrode 70.

The system of FIG. 8 is configured to determine, in case the appliance control device is actuated, whether the driver or the front passenger is attempting to interact with the appliance.

In operation, the seat heater 10a applies a first oscillating signal to the heating element in the driver seat 58, whereas the seat heater 10b applies a second oscillating signal to the heating element in the front passenger seat 60. The first and second signals are differently modulated (e.g. with mutually orthogonal pseudo-random sequences) so that a receiver can distinguish between the first and second signals. The first and second signals are thus indicative of the driver seat 58 and the front passenger seat 60, respectively. The sensing network 72 is configured for detecting an electric signal (current or voltage) induced in the antenna electrode 70 in response to an electric field caused by the first or the second oscillating signal. Depending on the relative signal strengths of the first and the second oscillating signals received by the antenna electrode 70, the sensing network determines whether the driver 66 or the passenger 68 is attempting to interact with to the appliance. In the situation of FIG. 8, the passenger 68 reaches out their hand towards the appliance control device 62. Thereby they increase capacitive coupling between the heating element in the passenger seat 60 and the antenna electrode 70. As a result, the sensing network 72 senses higher signal strength of the second signal than of the first signal. If the appliance control device 62 is actuated in that moment, the appliance knows that it is the passenger 68 who is attempting to interact with it. The appliance is configured to adapt its behaviour depending on whether it is the driver or the front passenger who interacts with it.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A seat heater in combination with a capacitive sensing device, comprising:
   an electric heating element connected between a first node and a second node to dissipate heat when a heating current is caused to flow between said first and second nodes, across said heating element;
   a first electric component connected between said first node and a third node, said third node being operatively connectable to a first terminal of a power supply, said first electric component providing a controllable first conductance between said first and third nodes;
   a second electric component connected between said second node and a fourth node, said fourth node being operatively connectable to a second terminal of said power supply, said second electric component providing a controllable second conductance between said second and fourth nodes;
   a control network having a mode of operation in which said control network applies an oscillating signal to said heating element, said control network being connected to said first electric component to control said first conductance and to said second electric component to control said second conductance;
   wherein, for applying said oscillating signal to said heating element, said control network is configured to modulate said first conductance and said second conductance in such a way that a variation of a voltage drop between said first and third nodes is of the same amplitude but of opposite sign to a variation of a voltage drop between said fourth and second nodes.

2. The seat heater in combination with the capacitive sensing device as claimed in claim 1, wherein said first electric component comprises a first transistor connected between said first node and said third node, said first transistor having a control node to which said control network is connected to modulate said first conductance; and wherein said second electric component comprises a second transistor connected between said second node and said fourth node, said second transistor having a control node to which said control network is connected to modulate said second conductance.

3. The seat heater in combination with the capacitive sensing device as claimed in claim 2, wherein said control network comprises an amplifier wherein said first and second transistors form a push-pull output stage.

4. The seat heater in combination with the capacitive sensing device as claimed in claim 2, wherein said control network comprises a voltage source for generating said oscillating signal, said voltage source being operatively connected to the control node of said first transistor; and wherein said control network comprises a current source including said second transistor.

5. The seat heater in combination with the capacitive sensing device as claimed in claim 4, wherein said current source comprises a reference current source for providing a reference current and a current mirror for drawing across said heating element a current corresponding to said reference current.

6. The seat heater in combination with the capacitive sensing device as claimed in claim 1, wherein said control network has a mode of operation in which said oscillating signal is not applied to said heating element and in which said control network controls said first conductance and said second conductance in such a way as to achieve a target temperature.

7. The seat heater in combination with the capacitive sensing device as claimed in claim 1, wherein said control network comprises an input node for receiving a desired oscillating signal to be applied to said heating element by said control network.

8. The seat heater in combination with the capacitive sensing device as claimed in claim 7, wherein said control network comprises a first feedback branch operatively coupled to said first node to bring an oscillating signal on said first node into accordance with said desired oscillating signal and/or a second feedback branch operatively coupled to said second node to bring an oscillating signal on said second node into accordance with said desired oscillating signal.

9. The seat heater in combination with the capacitive sensing device as claimed in claim 1, wherein said oscillating signal is comprised in a frequency band from 50 kHz to 2 MHz.

10. A capacitive occupancy sensing and heating device, comprising
    a seat heater in combination with a capacitive sensing device as claimed in claim 1, said capacitive sensing device being a capacitive occupancy sensor,
    wherein said capacitive occupancy sensor includes an antenna electrode and a capacitive sensing network for applying an oscillating signal to said antenna electrode, and
    wherein said control network and said capacitive sensing network are configured in such a way that said oscillating signal applied to said antenna electrode and said oscillating signal applied to said heating element are of same amplitude and phase.

11. A vehicle seat comprising a capacitive occupancy sensing and seat heating device as claimed in claim 10, said vehicle seat having a seat surface for accommodating an occupant, wherein said antenna electrode is arranged between said seat surface and said heating element.

12. An automotive vehicle comprising
    a first vehicle seat, said first vehicle seat having associated therewith a seat heater in combination with a capacitive sensing device as claimed in claim 1, the heating element of which is arranged in said first vehicle seat, and the oscillating signal of which is indicative of said first vehicle seat;
    a second vehicle seat, said second vehicle seat having associated therewith a seat heater in combination with a capacitive sensing device as claimed in claim 1, the heating element of which is arranged in said second vehicle seat, and the oscillating signal of which is indicative of said second vehicle seat;
    an appliance including an appliance control device;
    wherein said vehicle includes an antenna electrode arranged with said appliance control device and a sensing network associated with said appliance control device, said sensing network being connected to said antenna electrode and configured for detecting an electric signal induced in said antenna electrode in response to an electric field caused by an oscillating signal applied to the heating element arranged in said first vehicle seat or by an oscillating signal applied to the heating element arranged in said second vehicle seat, said electric signal induced in said antenna electrode being indicative of whether an occupant of said first or said second vehicle seat has a part of their body proximate to said appliance control device, and in that said appliance is configured to adapt its behaviour depending on whether an occupant on said first or said second vehicle seat has a part of their body proximate to said appliance control device.

13. The automotive vehicle as claimed in claim 12, wherein said appliance comprises at least one of a radio, a car navigation system, an HVAC system and an infotainment system.

14. A seat heater in combination with a capacitive sensing device, comprising an electric heating element connected between a first node and a second node to dissipate heat when a heating current is caused to flow between said first and second nodes, across said heating element;
  a first transistor connected between said first node and a third node, said third node being operatively connectable to a first terminal of a power supply, said first transistor providing a controllable first conductance between said first and third nodes;
  a second transistor connected between said second node and a fourth node, said fourth node being operatively connectable to a second terminal of said power supply, said second transistor providing a controllable second conductance between said second and fourth nodes;
  a control network having a mode of operation in which said control network applies an oscillating signal to said heating element, said control network being connected to said first transistor to control said first conductance and to said second transistor to control said second conductance;
  wherein, for applying said oscillating signal to said heating element, said control network is configured to modulate said first conductance and said second conductance in such a way that a variation of a voltage drop between said first and third nodes is of the same amplitude but of opposite sign to a variation of a voltage drop between said fourth and second nodes.

15. The seat heater in combination with the capacitive sensing device as claimed in claim 14, wherein said first transistor comprises a control node, to which said control network is connected to modulate said first conductance; and wherein said second transistor comprises a control node, to which said control network is connected to modulate said second conductance.

* * * * *